Patented Dec. 24, 1940

2,226,150

UNITED STATES PATENT OFFICE 2,226,150

HEAT RESISTANT PAINTED FABRIC

Robert C. Alborn, Rochester, N. Y., assignor to Eastman Kodak Company, Rochester, N. Y., a corporation of New Jersey No Drawing. Application February 12, 1938, Serial No. 190,322

5 Claims. (Cl. 91—68)

This invention relates to heat-resisting paint, and more particularly to a paint for coating the canvas or other material surrounding steam-pipe insulation. Prior to my invention, no paint was known which was entirely satisfactory and of suitable durability for this purpose. Some of the properties which are desirable in a paint for coating canvas surrounding steam-pipe insulation are: good adhesion, good covering power, low penetration, and lack of deteriorating effect on the canvas.

I have discovered that a very satisfactory heat-resisting paint for coating the canvas or other material surrounding steam-pipe insulation or otherwise subjected to high temperatures can be made by compounding together an asphalt, an oil-resin varnish, a metallic bronze powder, and an extending pigment. I prefer to use aluminium bronze as the bronze powder, and magnesium oxide as the extending pigment. Such a paint shows good water resistance, good adhesion, good coverage, low penetration, and excellent durability. Moreover, after 10 months exposure to a temperature of approximately 150° F. on steam-pipe insulation, the strength of the canvas painted with my novel paint was found to be greater than that of unpainted canvas exposed to the same conditions for the same length of time, while the strength of canvas coated with other paints and exposed to the same conditions for the same length of time was less than that of the exposed unpainted canvas.

As an example of the way in which my invention may be carried out, I may thoroughly mix together the following ingredients:

1 lb. of aluminium bronze powder
1½ lbs. of magnesium oxide
1 gal. of a mixture made up of—

|  | Per cent |
| --- | --- |
| Oxidized asphalt, M. P. 250° F. | 31 |
| Manjak asphalt | 12 |
| Dichloroethyl ether | 8 |
| Chlorinated naphthalene | 5 |
| Xylene | 44 |

¼ gal. of an oil-resin varnish consisting of—

| | |
| --- | --- |
| Mineral spirits | 60 |
| Ester gum | 15 |
| Linseed oil | 25 |
| Drier | Trace |

The percentages given are by weight.

It will be understood that the proportions of the ingredients may be varied, and that different solvents, different oil-resin varnishes, and different asphalts may be used, as well as different metallic bronze powders and different extending pigments. However, omission of any one of the four essential ingredients, namely, asphalt, bronze powder, extending pigment and oil-resin varnish, greatly decreases the suitability and desirable properties of the paint.

What I claim as my invention and desire to be secured by Letters Patent of the United States is:

1. Steam-pipe insulation covering comprising canvas and, directly on the canvas, a heat-resisting paint comprising an asphalt, an oil-resin varnish, a metallic bronze powder, and an extending pigment, whereby the canvas is preserved.

2. Steam-pipe insulation covering comprising canvas and, directly on the canvas, a heat-resisting paint comprising an asphalt, an oil-resin varnish, aluminium bronze powder, and an extending pigment, whereby the canvas is preserved.

3. Steam-pipe insulation covering comprising canvas and, directly on the canvas, a heat-resisting paint comprising an asphalt, an oil-resin varnish, a metallic bronze powder, and magnesium oxide, whereby the canvas is preserved.

4. Steam-pipe insulation covering comprising canvas and, directly on the canvas, a heat-resisting paint comprising an asphalt, an oil-resin varnish, aluminium bronze powder, and magnesium oxide, whereby the canvas is preserved.

5. Steam-pipe insulation covering comprising canvas and, directly on the canvas, a heat-resisting paint comprising an asphalt, an oil-resin varnish, aluminium bronze powder, and magnesium oxide, the ratio by weight of the magnesium oxide to the aluminium bronze powder being approximately 1½ to 1, whereby the canvas is preserved.

ROBERT C. ALBORN.